United States Patent
Albrecht et al.

(10) Patent No.: US 7,925,641 B2
(45) Date of Patent: Apr. 12, 2011

(54) INDEXING WEB CONTENT OF A RUNTIME VERSION OF A WEB PAGE

(75) Inventors: Frank Albrecht, Walldorf (DE); Stephan Klevenz, Heidelberg (DE)

(73) Assignee: SAP AG, Walldorf (DE)

( * ) Notice: Subject to any disclaimer, the term of this patent is extended or adjusted under 35 U.S.C. 154(b) by 205 days.

(21) Appl. No.: 11/859,718

(22) Filed: Sep. 21, 2007

(65) Prior Publication Data
US 2009/0083293 A1    Mar. 26, 2009

(51) Int. Cl.
*G06F 17/30* (2006.01)
*G06F 7/00* (2006.01)

(52) U.S. Cl. .................... 707/711; 707/706
(58) Field of Classification Search .......... 707/3, 102, 707/706, 711
See application file for complete search history.

(56) References Cited

U.S. PATENT DOCUMENTS

| | | | |
|---|---|---|---|
| 6,253,198 B1 * | 6/2001 | Perkins | 707/3 |
| 6,460,033 B1 * | 10/2002 | Perttunen | 707/4 |
| 6,581,072 B1 * | 6/2003 | Mathur et al. | 707/711 |
| 6,643,641 B1 * | 11/2003 | Snyder | 707/709 |
| 7,725,454 B2 * | 5/2010 | Kamani et al. | 707/711 |
| 2004/0148318 A1 * | 7/2004 | Taylor et al. | 707/203 |
| 2008/0140626 A1 * | 6/2008 | Wilson | 707/3 |

* cited by examiner

*Primary Examiner* — Charles E Lu
(74) *Attorney, Agent, or Firm* — Mintz, Levin, Cohn, Ferris, Glovsky & Popeo, PC

(57) ABSTRACT

A system, article and method of indexing web content is presented. An attribute is generated for a rendered web page rendered by a display component. The attribute includes a uniform resource locator to the rendered web page, and the rendered web page is associated with a complex resource structure that defines content of a design time version of the rendered web page. The attribute is added to the complex resource structure, and the uniform resource locator from the attribute is indexed in a search engine index.

13 Claims, 2 Drawing Sheets ered as a proxy of the design time page. In many cases, the display component utilizes a search engine for searching the knowledge management system, locating the desired web content, requesting the runtime page and

INDEXING WEB CONTENT OF A RUNTIME VERSION OF A WEB PAGE

BACKGROUND

This disclosure relates generally to network searching systems, and more particularly to systems and methods for improved index structures for faster and better network searches.

One conventional tool for searching for internet content is a "web crawler." A web crawler is a semi-autonomous software program that "crawls" completely over individual web sites of a network such as the Internet, corporate Intranet, etc. The web crawler typically iterates over all resources of a site, to determine the content of each page of a site. Thus, the web crawler is able to detect page changes and to trigger indexing of those changes. However, since changes to pages of a site occur regularly and numerously, the index is almost never up-to-date, and having to perform such crawls can lead to performance issues.

Another approach includes indexing the complete resource structure of the content on a page. Yet this approach does not index the same data as will be viewed by a user, and leads to mismatches between a search request and a search result. Further, hypertext markup language (HTML) preview of such search results is not supported. An example of this approach can be found in the Web Page Composer tool of the SAP Enterprise Portal, provided by SAP AG of Walldorf, Germany. The Web Page Composer is a visual composer tool to create web sites in an Enterprise Portal or other such interface.

Using the Web Page Composer tool, web sites are stored in a knowledge management repository, a particular type of relational database, as complex resource structures. From these complex resource structures, a display component of the Web Page Composer builds a page that can be viewed by a user. The index-relevant data is only accessible via the displayed page, which is also viewable by the user. All modifications of the page are applied to the complex resource structure, which is itself not "aware" as to how and where the associated page is to be displayed.

SUMMARY

In general, this document discloses systems and methods for improved indexing of web content. The web content indexing systems and methods are used by a knowledge management system for an enterprise portal or other graphical user interface for displaying the web content. These systems and methods allow a user to search for pages in a navigation context, while ensuring up-to-date indexes for the rendered web pages.

In one aspect, a method of indexing web content includes generating an attribute for a rendered web page rendered by a display component. The attribute includes a uniform resource locator to the rendered web page, and the rendered web page is associated with a complex resource structure that defines content of a design time version of the rendered web page. The method further includes adding the attribute to the complex resource structure, and indexing the uniform resource locator from the attribute in a search engine index.

In another aspect, an article is presented. The article includes a tangibly-embodied machine-readable medium operable to cause one or more machines to result in operations that generate an attribute for a rendered web page rendered by a display component, add the attribute to the complex resource structure, and index the uniform resource locator from the attribute in a search engine index.

In yet another aspect, a system for indexing web content includes a web page composer to create a web page, a knowledge management repository to store the web page, and a display component to retrieve the web page from the repository and render a rendered web page to a portal. The system further includes an attribute generator service to generate an attribute for a rendered web page rendered by a display component, the attribute including a uniform resource locator to the rendered web page. The rendered web page is associated with a complex resource structure that defines content of a design time version of the rendered web page. The attribute generator is further configured to add the attribute to the complex resource structure.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes systems and method for indexing web content so that each modification to a page of web content triggers an index operation. Accordingly, these systems and methods enable a complex resource structure, a data structure that defines the content of a page, to be aware of display component which generates a display based on the content of the page.

Figure 1:
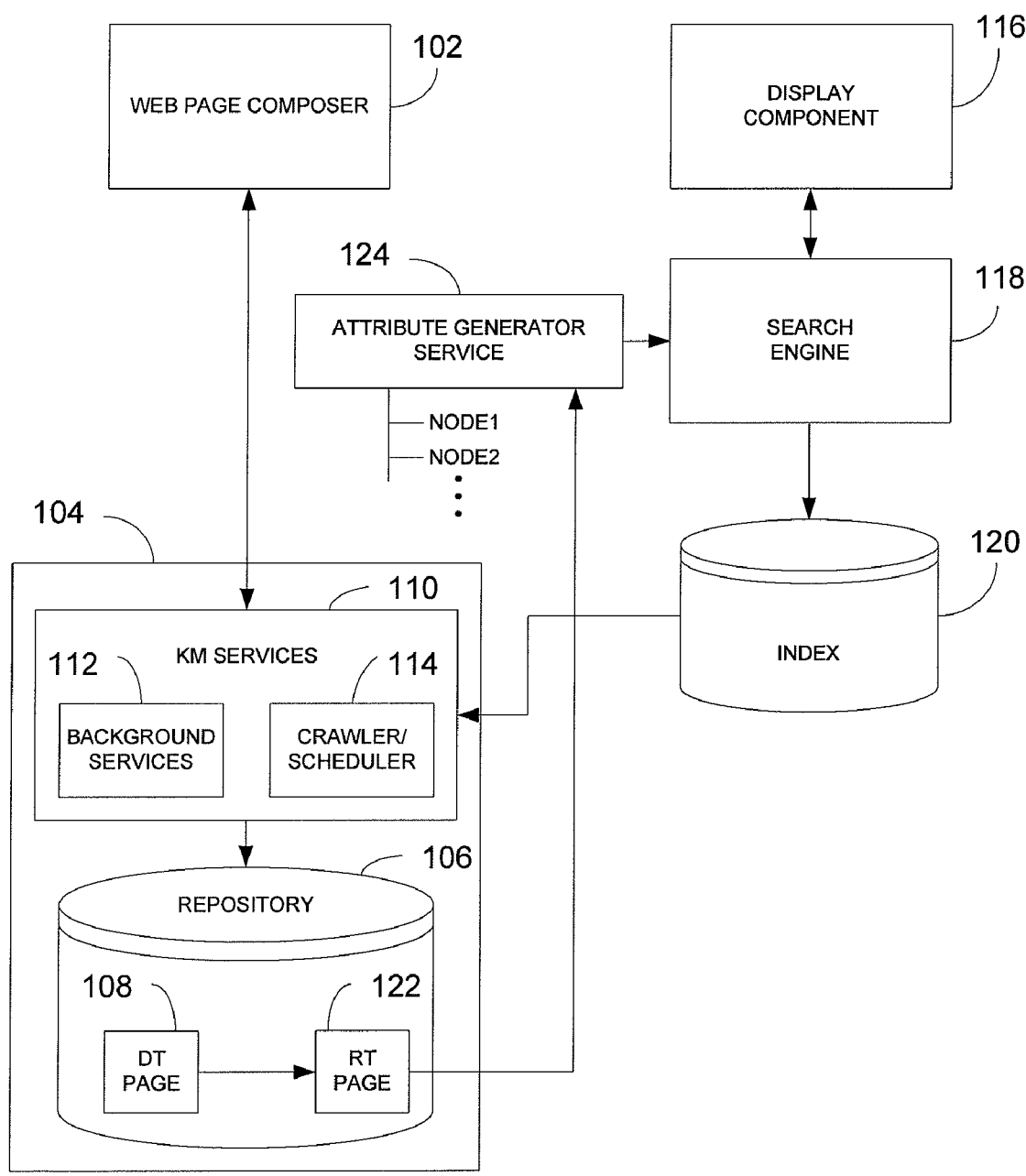
FIG. 1 is a functional block diagram of an enterprise portal management and search system.

FIG. 1 is a functional block diagram of an enterprise portal management and search system 100, which is suited for systems and methods for indexing web content as described herein. The system 100 includes a web page composer 102 for creating web sites. The web page composer 102 is preferably a visual modeling tool for modeling and creating a design time page 108 using a number of builder tools and graphical objects. The web page composer 102 stores design time web content to a knowledge management system 104 in a repository 106. The repository 106 is a preferably a multidimensional database.

The knowledge management system 104 includes a number of knowledge management (KM) services 110, such as a number of background services 112 and a crawler/scheduler 114, both explained in further detail below. The knowledge management system 104 stores the design time page 108 in the repository 106 as a complex resource structure, which in turn defines the content and organization of the web page.

To build a web page for display in a graphical user interface such as an enterprise portal or a web browser application, a display component 116 builds a visible runtime page 122 out of the complex resource structures that make up the design time web page 108. The runtime page 122 can be generated as a proxy of the design time page 108. In many cases, the display component 116 utilizes a search engine 118 for searching the knowledge management system 104, locating the desired web content, requesting the runtime page 122 and sending the requested runtime page to the display component 116 for display in the graphical user interface.

Modifications to the web page content is made via the web page composer 102 and done to the complex resource structures of the design time page 108. An attribute generator service 124 generates an attribute that stores a uniform resource locator (URL) to the display component 116 that renders each runtime page 122. The display component URL is sent to the search engine 118 for indexing in an index 120, thus ensuring that the search engine 118 is indexing what the user will see from the display component 116.

A search result list requested by a user from the search engine 118 shows all pages that include a requested search term. The search result list also shows one or more links that open requested pages in a portal navigation tree, as indicated by the attribute generator service 124 (NODE1, NODE2 . . . etc.). The necessary navigation information is retrieved by a first background service 112 that iterates all pages in the portal navigation tree. A second background service 112 detects the location of the page in the navigation structure and adds this information to the complex resource structures of the design time page(s) 108. Accordingly, the display component URL acts as a bridge between the design time page 108 and runtime page 122. Now, updates to the complex resource structures are reflected in incremental updates to the index 120 for the runtime page 122 content.

Figure 2:
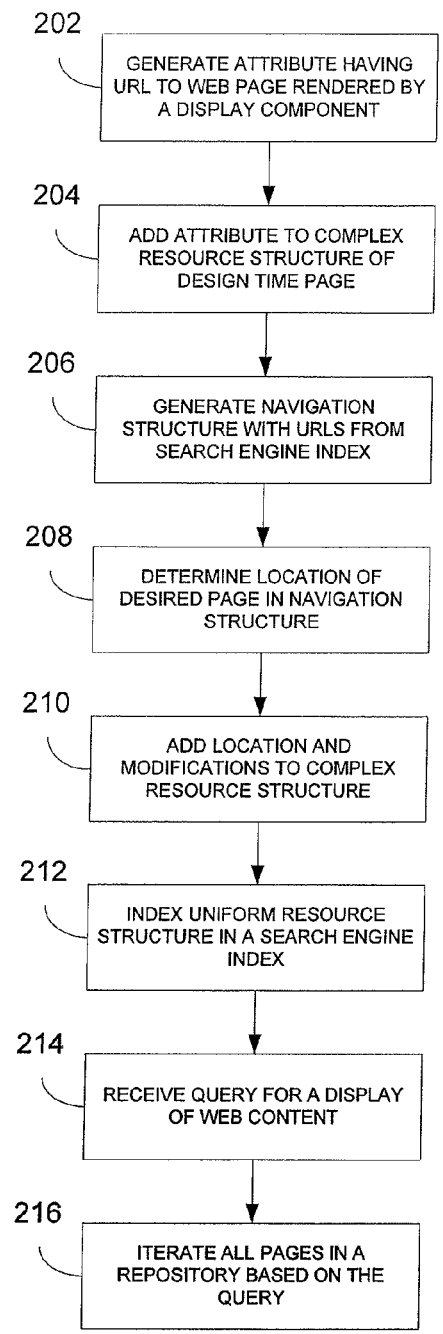
FIG. 2 is a flowchart of a method for indexing web content.

FIG. 2 is a flowchart of a method 200 for indexing web content. At 202, an attribute is generated for a web page that is being rendered by a display component. The display component is associated with a graphical user interface such as an enterprise portal or web browser or the like, and uses a search engine for locating the web page for rendering. The web page is constructed from content stored in a repository as one or more a complex resource structures. The attribute contains a URL to the display component that renders the web page.

At 204, the attribute is added to the one or more complex resource structures that make up the web page. If the requested web content is associated with at least one URL indexed in the search engine index, a navigation structure is generated using the URLs from the search engine index, at 206. At 208, a determination is made of a location in the of a desired web page in the navigation structure. At 210, the location data is added to the complex resource structure in the repository, which in turn gets reflected in the runtime version of the web page. Accordingly, the attribute provides a bridge between a design time page and a runtime page, to reflect in a display component and search engine index exactly what a user sees in the rendered runtime page.

At 212, the URL of the attribute is sent to the search engine for indexing. Thus, a search engine index will index exactly what a user will see from the rendered web page. At 214, a query is received for web content, and at 216 all pages in the repository are iterated by a background service of the repository in communication with the search engine. Thus, each modification to a page of web content triggers an index operation.

One or more of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A method of indexing web content, the method comprising:
    generating, by one or more processors, an attribute for a runtime version of a web page rendered by a display component, the attribute including a uniform resource locator to the display component that renders the runtime version of the rendered web page, the rendered web page being associated with a complex resource structure, the complex resource structure being a data structure that defines content of a design time version of the rendered web page, the complex resource structure being stored in a repository, the rendered runtime version of the web page being visible to a user;
    adding, by the one or more processors, the attribute to the complex resource structure;
    indexing, by the one or more processors, the uniform resource locator from the attribute in a search engine index;
    iterating, by the one or more processors, all web pages in the repository associated with the uniform resource locator to determine the web content to be displayed;
    detecting, by the one or more processors, a location of the rendered web page in a navigation structure generated from a portal navigation process, the navigation structure including the uniform resource locator, the navigation structure being displayed at the display component; and
    adding, by the one or more processors, the location of the rendered web page in the navigation structure to the complex resource structure, wherein a modification to the design-time version of the rendered web page is reflected in incremental updates to an index created by the indexing.

2. A method in accordance with claim 1, further comprising retrieving navigation information based on a request for a search of the repository for the rendered web page.

3. A method in accordance with claim 2, further comprising accessing the search engine index to retrieve the uniform resource locator of the display component based on the request for the search.

4. An article comprising a computer-readable storage medium operable to cause one or more machines to result in operations comprising:
    generate, by the one or more machines, an attribute for a runtime version of a web page rendered by a display component, the attribute including a uniform resource locator to the display component that renders the runtime version of the rendered web page, the rendered web page being associated with a complex resource structure, the complex resource structure being a data structure that defines content of a design time version of the rendered web page, the complex resource structure being stored in a repository, the rendered runtime version of the web page being visible to a user;
    add, by the one or more machines, the attribute to the complex resource structure;
    index, by the one or more machines, the uniform resource locator from the attribute in a search engine index;
    iterate, by the one or more machines, all web pages in the repository associated with the uniform resource locator to determine the web content to be displayed;
    detect, by the one or more machines, a location of the rendered web page in a navigation structure generated from a portal navigation process, the navigation structure including the uniform resource locator, the navigation structure being displayed at the display component; and
    add, by the one or more machines, the location of the rendered web page in the navigation structure to the complex resource structure, wherein a modification to the design-time version of the rendered web page is reflected in incremental updates to an index created by the indexing.

5. An article in accordance with claim 4, further comprising an operation to retrieve, by the one or more machines, navigation information based on a request for a search of the repository for the rendered web page.

6. An article in accordance with claim 5, further comprising an operation to access, by the one or more machines, the search engine index to retrieve the uniform resource locator of the display component based on the request for the search.

7. An article in accordance with claim 4, further comprising an operation to display, using the display component, the navigation structure including the uniform resource locator.

8. A system for indexing web content, the system comprising:
one or more processors;
a web page composer, implemented by the one or more processors, that creates a web page;
a knowledge management repository that stores the web page, the knowledge management repository being a part of a knowledge management system;
a display component, implemented by the one or more processors, that retrieves the web page from the knowledge management repository and render a rendered web page to a portal; and
an attribute generator service, implemented by the one or more processors, to generate an attribute for a runtime version of a web page rendered by a display component, the attribute including a uniform resource locator to the display component that renders the runtime version of the rendered web page, the rendered runtime version of the web page being visible to a user and being associated with a complex resource structure, the complex resource structure being stored in a repository, the complex resource structure being a data structure that defines content of a design time version of the rendered web page, the attribute generator service further configured to detect a location of the rendered web page in a navigation structure generated from the portal, to index the uniform resource locator from the attribute in a search engine index, to iterate all web pages in the repository associated with the uniform resource locator to determine the web content to be displayed, to add the location of the rendered web page in the navigation structure to the complex resource structure, and to add the attribute to the complex resource structure, the navigation structure including the uniform resource locator, the navigation structure being displayed at the display component, a modification to the design-time version of the rendered web page being reflected in incremental updates to an index created by the indexing.

9. A system in accordance with claim 8, further comprising a search engine, implemented by the one or more processors, that receives a query for the web page and generates a navigation structure for the web page based on the query.

10. A system in accordance with claim 9, further comprising a search engine index, implemented by the one or more processors, to receive and index the uniform resource locator for the rendered web page.

11. A system in accordance with claim 9, wherein the knowledge management system further includes a set of background services, implemented by the one or more processors, to iterate over web pages in the knowledge management repository that are related to the query.

12. A system in accordance with claim 11, wherein the knowledge management system further includes a web crawler, implemented by the one or more processors, for executing a search based on the query.

13. A method in accordance with claim 1, wherein the design time version of the rendered web page is created and modeled using a visual modeling tool.

* * * * *